United States Patent
Amirijoo et al.

(10) Patent No.: US 8,805,362 B2
(45) Date of Patent: Aug. 12, 2014

(54) METHOD AND ARRANGEMENT FOR SATISFYING PERFORMANCE REQUIREMENTS BY TUNING PARAMETERS FOR ACCESSING A NETWORK WITH RANDOM ACCESS CHANNELS

(75) Inventors: Mehdi Amirijoo, Linköping (SE); Pål Frenger, Linköping (SE); Fredrik Gunnarsson, Linköping (SE); Johan Moe, Mantorp (SE); Kristina Zetterberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 13/061,856

(22) PCT Filed: Sep. 11, 2008

(86) PCT No.: PCT/SE2008/051019
§ 371 (c)(1),
(2), (4) Date: Mar. 2, 2011

(87) PCT Pub. No.: WO2010/030212
PCT Pub. Date: Mar. 18, 2010

(65) Prior Publication Data
US 2011/0165874 A1    Jul. 7, 2011

(51) Int. Cl.
*H04W 4/00* (2009.01)
*H04L 12/28* (2006.01)

(52) U.S. Cl.
USPC .................... 455/434; 370/252; 370/254

(58) Field of Classification Search
CPC ............ H04W 4/0833; H04W 72/085
USPC .................... 455/434; 370/252, 254
See application file for complete search history.

(56) References Cited

U.S. PATENT DOCUMENTS 5,276,911 A * 1/1994 Levine et al. .......... 455/510
6,487,420 B1 * 11/2002 Jonsson .................. 455/522

(Continued)

FOREIGN PATENT DOCUMENTS

| CN | 1731888 A | 2/2006 |
| EP | 0 993 212 | 4/2000 |
| EP | 1427157 A1 | 6/2004 |

OTHER PUBLICATIONS

International Search Report for PCT/SE2008/051019, mailed Aug. 31, 2009.
Written Opinion of the International Searching Authority for PCT/SE2008/051019, mailed Aug. 31, 2009.

(Continued)

*Primary Examiner* — Wesley Kim
(74) *Attorney, Agent, or Firm* — Nixon & Vanderhye P.C.

(57) ABSTRACT

A method and a communication network node for satisfying detection miss probability and false detection probability requirements in a random access channel used by mobile stations (MS) for accessing a communication network system comprising radio base stations (BS) each serving at least one cell (19). The method includes optimizing a random access channel, wherein the method performs estimating detection miss probability (P m) in said cell, tuning random access parameters such that said estimated detection miss probability satisfies predetermined requirements, estimating a false detection probability (P f) in said communication cell (19), tuning said random access parameters such that said estimated false detection probability satisfies predetermined requirements, and tuning said random access parameters such that an extensive interference caused by mobile stations attempting random access in said communication cell is avoided.

25 Claims, 12 Drawing Sheets

(56) References Cited

U.S. PATENT DOCUMENTS

| | | | |
|---|---|---|---|
| 7,072,327 B2* | 7/2006 | Dick | 370/345 |
| 8,094,616 B2* | 1/2012 | Choi et al. | 370/329 |
| 2002/0118661 A1* | 8/2002 | Voce | 370/337 |
| 2004/0247053 A1* | 12/2004 | Rached et al. | 375/340 |
| 2008/0108353 A1* | 5/2008 | Lee et al. | 455/437 |
| 2008/0304506 A1* | 12/2008 | Becker et al. | 370/441 |
| 2010/0275087 A1* | 10/2010 | Doppler et al. | 714/749 |
| 2010/0329182 A1* | 12/2010 | Wigard et al. | 370/328 |

OTHER PUBLICATIONS

International Preliminary Report on Patentability for PCT/SE2008/051019, dated Jun. 3, 2010.

Written Opinion of the International Preliminary Examining Authority for PCT/SE2008/051019, mailed Nov. 29, 2010.

Panasonic et al., "Random Access Burst Design for E-UTRA", $3^{rd}$ Generation Partnership Project (3GPP), No. R1-062175, (Aug. 28, 2006), pp. 1-9.

Chinese Office Action with English translation, mailed May 17, 2013 in Chinese Application No. 200880131108.7.

* cited by examiner

METHOD AND ARRANGEMENT FOR SATISFYING PERFORMANCE REQUIREMENTS BY TUNING PARAMETERS FOR ACCESSING A NETWORK WITH RANDOM ACCESS CHANNELS

This application is the U.S. national phase of International Application No. PCT/SE2008/051019, filed Sep. 11, 2008, which designated the U.S., the entire contents of which is hereby incorporated by reference.

TECHNICAL FIELD

The present invention relates to a method for satisfying performance requirements of a random access channel used by a mobile station for accessing a communication network accessible in a communication cell served by a radio base station, wherein said mobile station communicates on uplink and downlink channels. The invention further relates to a communication network node using said method.

BACKGROUND

The demand for wireless data services, such as text messaging (SMS), multi-media messaging (MMS), mobile video and IPTV, demanding higher bandwidth is growing quickly. The third generation partnership project (3GPP) is developing the third generation mobile systems based on evolved GSM core networks and the radio access technology UMTS terrestrial radio access (UTRA) and has come up with a new orthogonal frequency division multiple access (OFDMA) based technology through the long term evolution (LTE) work, which provides a very efficient wireless solution. The OFDMA based air interface is often referred to as the evolved UMTS terrestrial radio access network (E-UTRAN).

The architecture of the LTE system is shown in FIG. 1. In LTE the downlink (DL) is based on orthogonal frequency division multiplexing (OFDM), while the uplink (UL) is based on a single carrier modulation method known as discrete Fourier transform spread OFDM (DFT-S-OFDM).

During initial access, a mobile station (MS) seeks access to the network in order to register and commence services. The random access (RA) serves as an uplink control procedure to enable the MS to access a communication network operated from a base station (BS) serving a communication cell. Since an initial access attempt cannot be scheduled by the network, the RA procedure is by definition contention based. Collisions may occur and an appropriate contention-resolution scheme needs to be implemented.

Including user data on the contention-based uplink is typically not spectrally efficient due to a need for guard periods and retransmissions. Therefore, for LTE it has been decided to separate a transmission of a random access burst (a preamble), the purpose of which is to obtain uplink synchronization, from a transmission of user data.

The LTE RA procedure serves two main purposes:
  It lets the MS align its UL timing to that expected by the eNode B (see FIG. 1) in order to minimize interfering with other MSs transmissions. UL time alignment is a requirement in E-UTRAN before data transmissions may commence.
  It provides means for the MS to notify the network of its presence and enables the eNode B to give the MS initial access to the system.
In addition to the usage during initial access, the RA will also be used when the MS has lost the uplink synchronization or when the MS is in an idle or a low-power mode.

The basic RA procedure is a four-phase procedure, as outlined in FIG. 2, and is as follows:
  In phase 1, the MS 18 transmits a random access preamble (step 21), allowing the eNode B (BS) to estimate the timing of the MS. Uplink synchronization is necessary as the MS otherwise cannot transmit any uplink data;
  In phase 2, the network transmitting a timing advance command (step 22) to correct the uplink timing, based on the timing of preamble arrival in the first step. In addition to establishing uplink synchronization, phase 2 also assigns uplink resources and temporary identifier to the MS to be used in phase 3 of a random access procedure;
  Phase 3, consists of signalling from the MS 18 to the network (step 23) using the UL-SCH similar to normal scheduled data. A primary function of this message is to uniquely identify the MS 18. The exact content of this signalling depends on the state of the MS 18, e.g., whether it is previously known to the network or not;
  The final phase (phase 4), is responsible for contention resolution in case multiple MSs tried to access the system on the same resource.

For cases where the network knows, in advance, that a particular MS will perform a Random Access Procedure to acquire uplink synchronization, a contention-free variety of the Random Access Procedure has been agreed. This effectively makes it possible to skip the Contention Resolution process of Phases 3 and 4 for important cases such as arrival to target cell at handover (HO) and arrival of DL data.

Phase 1—Random Access Preamble

Prior to sending a preamble, the MS shall synchronize to the downlink transmissions and read the Broadcast Control Channel (BCCH). The BCCH will reveal where the RA time slots are located, which frequency bands may be used, the settings of the power control parameters, and which preambles (sequences) are available.

At the next RA slot, the MS will send the preamble. The preamble sequence implicitly includes a random ID, which identifies the MS. LTE provides for each cell 64 such random IDs and thus 64 preambles.

If multiple RA frequency bands have been defined, the MS randomly selects one of them. The group of sequences allocated to a cell is partitioned into two subgroups. By selecting a preamble sequence from a specific subgroup, the MS can give a single-bit indication of its resource requirement and/or link quality. The particular sequence used for the preamble is randomly selected within the desired subgroup. This sequence implicitly contains a random ID, which serves as an MS identifier.

The eNode B estimates the UL timing of the MS based on the timing of the received preamble.

Phase 2—Random Access Response

After the preamble transmission, the MS waits for an RA Response message on the DL-SCH, the DL assignment which is indicated on the L1/L2 control channel (DPCCH). The RA Response message is transmitted semi-synchronously (i.e. within a window) to the reception of the RA Preamble in order to allow the scheduler more flexibility. The RA Response contains:
  the same random MS identity as present in the preamble;
  a time alignment message to provide the proper uplink timing to the MS;
  a temporary Radio Network Temporary Identifier (RNTI) which is unique for the particular RA resource (time, channel and preamble) used in Phase 1. For initial access, the temporary RNTI shall be used for Phases 3 and 4;

a UL resource grant for transmission on UL-SCH in Phase 3.

If no RA Response message has been received after a certain time following the preamble transmission, the MS shall send a new preamble at the next RA time slot. It shall select new, random parameters for the preamble sequence and the non-synchronized RA frequency band. Furthermore, the MS will increase the power level of the preamble to obtain a power ramping procedure similar as used in WCDMA.

Phase 3—First Scheduled UL Transmission

In Phase 3, the MS provides the network with a unique identifier in the message it transmits on UL-SCH according to the grant contained in the RA Response. The type of MS identifier, e.g. C-RNTI, TMSI, IMSI or IMEI, depends on to which extent the MS is already known in the network.

In case of initial access, the message is an RRC Connection Request message. In case of non-initial access, i.e. when the MS is already RRC_CONNECTED, the MS identifier is the C-RNTI and is signalled by a MAC layer. The transmission uses HARQ.

Phase 4—Contention Resolution

The purpose of the fourth phase is to resolve contention. Note that, from the second step, multiple MSs performing simultaneously random access attempts using the same preamble listen to the same response message and therefore have the same temporary identifier. Hence, in the fourth phase, the eNode B echoes the MS identity provided by the MS in Phase 3. Only a terminal which finds a match between the identity received in the fourth step and the identity transmitted as part of the third step will declare the random access procedure successful. This terminal will also transmit a hybrid ARQ acknowledge in the uplink. For non-initial access, i.e. when the MS is already RRC_CONNECTED, the MS identity is reflected on the L1/L2 control channel. If the MS has not yet been assigned a C-RNTI, the temporary identity from the second step is promoted to the C-RNTI, otherwise the MS keeps its already assigned C-RNTI.

Terminals which do not find a match between the identity received in Phase 4 and the respective identity transmitted as part of Phase 3 are considered to have failed the random access procedure and need to restart the random access procedure with Phase 1; selecting new random parameters for the preamble sequence and the RA frequency band. No hybrid ARQ feedback is transmitted from these terminals.

Contention-Free Random Access Procedure

For cases where the network knows, in advance, that a particular MS will perform a Random Access Procedure to acquire uplink synchronization, a dedicated preamble is reserved and assigned to the MS under consideration. Dedicated Preamble assignment for HO is handled by RRC, whereas preamble assignment for DL data arrival is handled by MAC. When the MS transmits the dedicated preamble in Phase 1, the network knows to which MS this preamble was assigned and can already at the time of detection of this preamble determine the identity of the MS. Thus no contention resolution is needed and the delay before data transmission can be resumed is reduced.

Random Access Back-Off Procedure

For the event of Random Access overload, a Random Access Back-Off procedure is supported. This procedure prevents immediate new Random Access attempts which would only worsen a collision situation.

Random Access Channel Physical Resource

A single RA opportunity consists of a time slot and a fixed bandwidth. The RA time slot length $T_{RA}$ shall accommodate the preamble sent by the MS and the required guard period (GP) to take into account the unknown uplink timing. FIG. 3 shows the access burst timing for two MSs 18a and 18b, where the preamble is denoted 31 and the guard period (GP) is denoted 32. The timing misalignment amounts to 6.7 μs/km. 3GPP has decided for a minimum $T_{RA}$ of 1 ms. Here the preamble length is then 800 μs plus a cyclic prefix of around 102.5 μs. A guard time of 97.5 μs suffices for cell radii up to 15 km. Larger guard periods and cyclic prefix are needed to accommodate timing uncertainties from cells larger than 15 km. Such large cells may also require longer preambles to increase the received energy. In order to support RA under various cell conditions RAN1 has defined additionally 3 RA preamble formats which require a $T_{RA}$ of 2 ms or even 3 ms. These larger slots are created by the eNode B by not scheduling traffic in the consecutive sub-frame(s). Those extended preambles contain repetitions of the 800 μs long part and/or a longer cyclic prefix.

For TDD an additional "short" RA is defined. The short RA preamble only spans 133 μs. Because of this very short duration the preamble will most likely not contain a cyclic prefix but a technique called overlap-and-add will be used to enable frequency-domain processing. At present many details regarding applicability and performance of this short RA are still open.

According to 3GPP, the bandwidth of a RA opportunity is 1.08 MHz (6 RB). The effective bandwidth utilized by the RA preamble is 1.05 MHz leaving small spectral guard bands on each side. This is necessary since RA and regular uplink data are separated in frequency-domain but are not completely orthogonal.

For FDD systems, RA opportunities do not occur simultaneously in different frequency bands but are separated in time. This spreads processing load out in the RA receiver. 3GPP defines RA configurations determining how often RA opportunities occur. In total 16 such configurations are defined, ranging from one RA opportunity every 20 ms (very low RA load) to one every 1 ms (very high RA load).

In TDD not all sub-frames are DL sub-frames reducing sub-frames that can be allocated to RA. To provide also in TDD configurations for high RA loads multiple RA opportunities can be scheduled in a single sub-frame.

In order to compensate for the rather low frequency diversity obtained within 1.05 MHz the RA opportunity hops in frequency-domain. For FDD RA opportunities are restricted to the outermost 6 RBs of the physical uplink shared channel at each band edge.

The TDMA/FDMA structure of the RA opportunities in FDD is visualized in FIG. 4 where the time and frequency configuration of the PRACH, PUSCH, and PUCCH in the LTE uplink is shown. In this example, three RA opportunities with 1 ms length exist in each frame. Here only one 1.08 MHz band is allocated to RA at each time whereas several bands are possible in case of TDD. The RA opportunities always occur at the band edges of the physical uplink shared channel directly adjacent to the physical uplink control channel.

Preamble Format

FIGS. 5a to 5d shows random access preambles, wherein FIG. 5a shows the detailed timing of the basic random-access preamble 31. The preamble 31 is prefixed with a cyclic prefix (CP) 51 to enable simple frequency domain processing. Its length is in the order of $T_{GP}+T_{DS}=97.5+5$ μs=102.5 μs, where $T_{DS}$ corresponds to the maximum delay spread and $T_{GP}$ corresponds to the maximum round trip time. The CP 51 insures that the received signal is always circular (after removing the CP in the RA receiver) and thus can be processed by FFTs. Therefore, the "active" random-access preamble duration is $1000$ μs$-2 \cdot T_{GP}-T_{DS}=800$ μs. The RA subcarrier spacing is $\frac{1}{800}$ μs=1250 Hz.

FIG. 5b to FIG. 5d show the extended preamble formats. The format of FIG. 5b has an extended CP 51 and is suited for cell radii up to approximately 100 km. However, since no repetition occurs this format is only suited for environments with good propagation conditions. The format of FIG. 5c contains a repeated main preamble 31 and a cyclic prefix 51 of approximately 200 μs. With an RA opportunity length of 2 ms the remaining guard period is also approximately 200 μs. This format supports cell radii of up to approximately 30 km. The format of FIG. 5d also contains a repeated main preamble 31 and an extended CP 51. Using an RA opportunity length of 3 ms this format supports cell radii of up to approximately 100 km. In opposite to format of FIG. 5b the format of FIG. 5d contains a repeated preamble 31 and is therefore better suited for environments with bad propagation conditions.

Zadoff-Chu Sequences

The requirements on the sequence comprising the preamble are two-fold: good auto-correlation function (ACF) properties and good cross-correlation function (CCF) properties. A sequence that has ideal (periodic) ACF and CCF properties is the Zadoff-Chu sequence. The periodic ACF of Zadoff-Chu sequence is only non-zero at time-lag zero (and periodic extensions) and the magnitude of the CCF is equal to the square-root of the sequence length N. Due to special properties of Zadoff-Chu sequences the number of sequences is maximized if N is chosen prime. This together with the requirement that the effective RA bandwidth N·1250 Hz should fit into 1.05 MHz leads to N=839.

A Zadoff-Chu sequence of length N can be expressed, in the frequency domain, as $$X_{ZC}^{(u)}(k) = e^{-j\pi u \frac{k \cdot (k+1)}{N}} \quad (1)$$

where u is the index of the Zadoff-Chu sequence within the set of Zadoff-Chu sequences of length N. Out of one Zadoff-Chu sequence—in the following also denoted root sequence—multiple preamble sequences can be derived by cyclic shifting. Due to the ideal ACF of Zadoff-Chu sequence multiple mutually orthogonal sequences can be derived from a single root sequence by cyclic shifting one root sequence multiple times the maximum allowed round trip time plus delay spread in time-domain. The correlation of such a cyclic shifted sequence and the underlying root sequence has its peak no longer at zero but at the cyclic shift. If the received signal has now a valid round trip delay—i.e. not larger than the maximum assumed round trip time—the correlation peak occurs at the cyclic shift plus the round trip delay which is still in the correct correlation zone. FIG. 6a shows the correlation peak when the MS is close to Node B and FIG. 6b shows the correlation peak when the MS is almost at the cell border. In FIGS. 6a and 6b, 65 is the time delay which indicates the round trip delay and the arrows indicates the zones 0-5 indicating transmitted sequences. For small cells up to 1.5 km radii all 64 preambles can be derived from a single root sequence and are therefore orthogonal to each other. In larger cells not all preambles can be derived from a single root sequence and multiple root sequences must be allocated to a cell. Preambles derived from different root sequences are not orthogonal to each other.

One disadvantage of Zadoff-Chu sequences is their behaviour at high frequency offsets. A frequency-offset creates an additional correlation peak in time-domain. A frequency offset has to be considered high if it becomes substantial relative to the RA sub-carrier spacing of 1250 Hz, e.g. from 400 Hz upwards. The offset of the second correlation peak relative to the main peak depends on the root sequence. An offset smaller than $T_{CS}$ may lead to wrong timing estimates, whereas values larger than $T_{CS}$ increase the false alarm rate. In order to cope with this problem LTE has a high-speed mode (or better high frequency offset mode) which disables certain cyclic shift values and root sequences so that transmitted preamble and round trip time can uniquely be identified. Additionally a special receiver combining both correlation peaks is required. For cells larger than approximately 35 km no set of 64 preambles exists that allows unique identification of transmitted preamble and estimation of propagation delay, i.e. cells larger than 35 km cannot be supported in high speed mode.

Preamble Detection

A receiver at the eNodeB correlates the received signal with all the root sequences (Zadoff-Chu sequences) allocated to the eNodeB, see FIG. 7 If the correlation (height of the correlation peak) due to a preamble is higher than the detection threshold, then the preamble is detected. However, if the correlation is lower than the detection threshold then the preamble is not detected. We say in the latter case that we have a detection miss. The detection miss probability is the probability that the correlation between the root sequence and the received signal is less than the detection threshold when in fact a preamble was sent (i.e., we have a miss detection).

Correlation peaks may also occur due to noise or cross-interference from preambles derived from a different root sequence. A correlation due to noise or interference may become higher than the detection threshold, especially, if the detection threshold is set too low. In this case, no preamble is sent, however, the eNodeB concludes a preamble detection since the peak is above the threshold. We say that we have a false detection. The probability that a correlation peak due to noise or interference is higher than the detection threshold, i.e. we have a false detection, is called the false detection probability.

The correlation may be interpreted as the received power of a transmitted preamble. Hence, the detection performance is related to the preamble Signal power to Interference and Noise power Ratio, SINR. The notation of correlation and received power can be used interchangeably, and the cause of a missed detection can therefore be said to be due to insufficient correlation, or to insufficient received power.

From a user perspective, it is irrelevant if the random access attempt failed due to a miss detection or contention. Instead, it is the access probability that matters, which is the probability that a sent preamble is correctly detected without contention.

RACH Power Control

Power control has been agreed for RACH in LTE:

$$P_{RACH}(N) = \min\{P_{MAX}, P_{O\_RACH} + PL + (N-1)\Delta_{RACH} + \Delta_{Preamble}\}.$$

where $P_{RACH}$ is the preamble transmit power,

N=1, 2, 3, . . . is the RACH attempt number, $P_{MAX}$ is the maximum MS power, $P_{O\_RACH}$ is a 4-bit cell specific target received power signaled via BCCH with a granularity of 2 dB (difference in maximum and minimum $P_{O\_RACH}$ is 30 dB), PL is the path loss estimated by the MS, $\Delta_{RACH}$ is the power ramping step signaled via BCCH and represented by 2 bits (4 levels) with a granularity of 2 dB, $\Delta_{Preamble}$ is a preamble-based offset (format 0-3), see the Preamble format paragraph above.

Note that RACH attempts N=2, 3, 4, . . . includes retransmissions where:
- no RA Response message has been received by the MS (see FIG. 2),
- the RA Response message is intended for another preamble (MS),
- the contention resolution has failed and the MS has to try random access again.

In essence, the MS will increase its transmission power until network access is granted. There is typically an upper bound on the number of retransmissions and, thus, number of power increases.

Drawbacks of Existing Solutions

One of the fundamental problems related to RACH optimization is to adjust a set of RA parameters, e.g., desired target receive power $P_{0\_RACH}$, such that random access performance requirements are satisfied, and excessive interference generated by RACH is avoided.

The setting of RA parameters depends on a multitude of factors including, chosen root sequence (in general the preambles allocated to a cell), whether the cell is in high-speed mode or not, interference from neighboring cells, cell size etc.

Typically a wide range of RA parameters are simulated and those settings that satisfy given requirements and that minimize the interference are chosen. This approach is, however, not satisfactory due to the several reasons, e.g.:
- There is a need to perform extensive simulation test and field trials, which is very costly.
- Simulations may not be accurate, hence, the derived set of parameters may be sub-optimal.
- RA parameters need to be reconfigured if network characteristics changes, e.g., the inference levels increases, or preambles need to be changed, MSs start moving in a higher speed in a cell (due to for example a high way built).
- Finding good set of parameter using simulation or field trials is a slow process and not sufficiently responsive to changes in network, hence, it may take a while before RACH is optimized.
- One object of the present invention aims at alleviating the problems with today's solutions.

Patent documents related to this invention, such as U.S. Pat. Nos. 7,072,327 and 6,487,420, describe automated tuning of RA, however, none of them addresses E-UTRAN and Zadoff-Chu based random access, which is used in E-UTRAN.

SUMMARY

Accordingly, one object of the present invention is to provide an improved method and communication network node for enabling auto-tuning of random access procedures when mobile stations are accessing a communication network system comprising radio base stations each serving at least one cell and with which said mobile stations are communicating on uplink and downlink channels. The invention is also directed to a mobile station using said innovative communicating network system.

According to a first aspect of the present invention this objective is achieved through a method as defined in the characterising portion of claim 1, which specifies satisfying random access attempt success requirements during said random access procedures, wherein the method performs the steps of: estimating quantities related to random access attempt success statistics, tuning random access parameters such that said estimated quantities related to random access attempt success statistics satisfies predetermined requirements, and that an excessive interference caused by mobile stations attempting random access in said communication cell is avoided.

The quantities related to random access attempt success statistics comprise detection miss probability, false detection probability and access probability. As an alternative said quantities related to random access attempt success statistics comprise detection miss probability and access probability for a specific number of transmission attempt. Said sampling period is fixed or varying according to the amount of data needed to estimate said quantities.

According to a second aspect of the present invention this objective is achieved through an arrangement as defined in the characterising portion of independent device claim 15, which specifies a communication network node for enabling auto-tuning of a random access channel used by mobile stations (MS) when requesting access to a communication network system in a communication cell served by a radio base station (BS), wherein said mobile station communicates on uplink and downlink channels. The base station subsystem, comprises a Random Access (RA) optimizer for tuning random access parameters such that random access attempt success statistics satisfy predetermined requirements, and for tuning random access parameters such that excessive interference caused by mobile stations (MS) attempting random access in said communication cell is avoided.

Further embodiments are listed in the dependent claims.

Automatically optimizing RA parameters such that random access attempt success statistics satisfy given requirements, and extensive interference caused by RACH is avoided leads to lower costs for the operators in planning and tuning RACH, as well as improved system performance.

Some of the advantages offered by this invention are as follows:
- Very little or no human intervention is required when optimizing RA parameters, resulting in a reduction of operational expenditure (OPEX).
- Manual effort in setting and tuning RA parameters decreases.
- The method presented is based on feedback information and, as such, the RA optimization process is responsive to changes in radio propagation conditions in the cell.
- Radio propagation models based on, e.g., topology, are not needed, since the invention relies on the feedback information from the MSs and BS.
- The interference generated by RACH is minimized, thus, increasing the SNR (Signal Noice Ratio) and performance of the radio bearers in the cell where RA optimization is executed, as well as neighboring cells.
- The detection miss and access probabilities are maintained at acceptable levels, resulting in fewer preamble retransmissions by the MSs and acceptable access delays.
- The false detection probability is maintained at acceptable levels, reducing the signaling over the air and, thus, releasing resources for, e.g., user data.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 20 shows in:

a) setting the detection threshold D according to the distribution of the correlation peaks.

b) the noise distribution may be separated from the preamble distribution allowing the noise distribution to be estimated.

c) the noise distribution being estimated using any knowledge available regarding the noise distribution.

Figure 21:
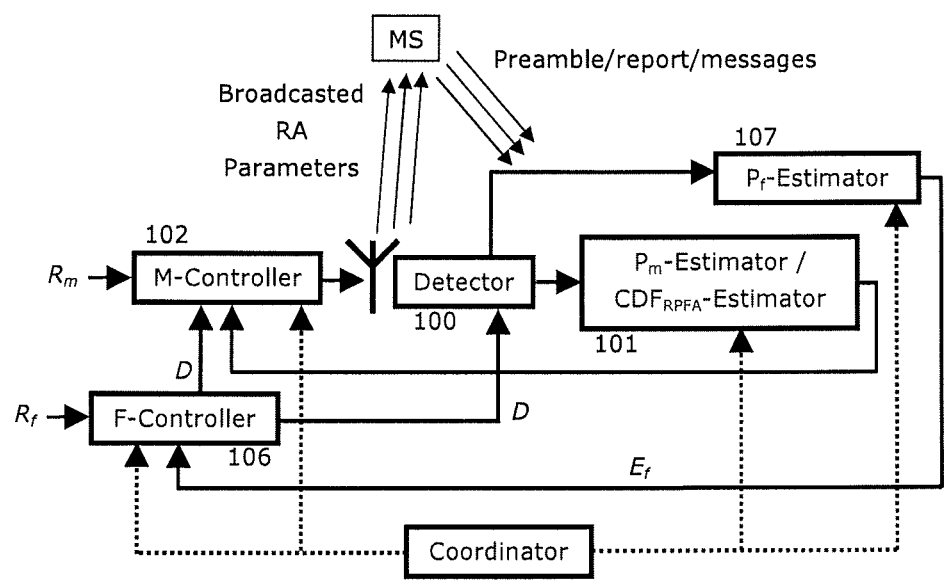

FIG. 21 shows a diagramme of a combined DMPC and RIC.

DETAILED DESCRIPTION

Figure 1:
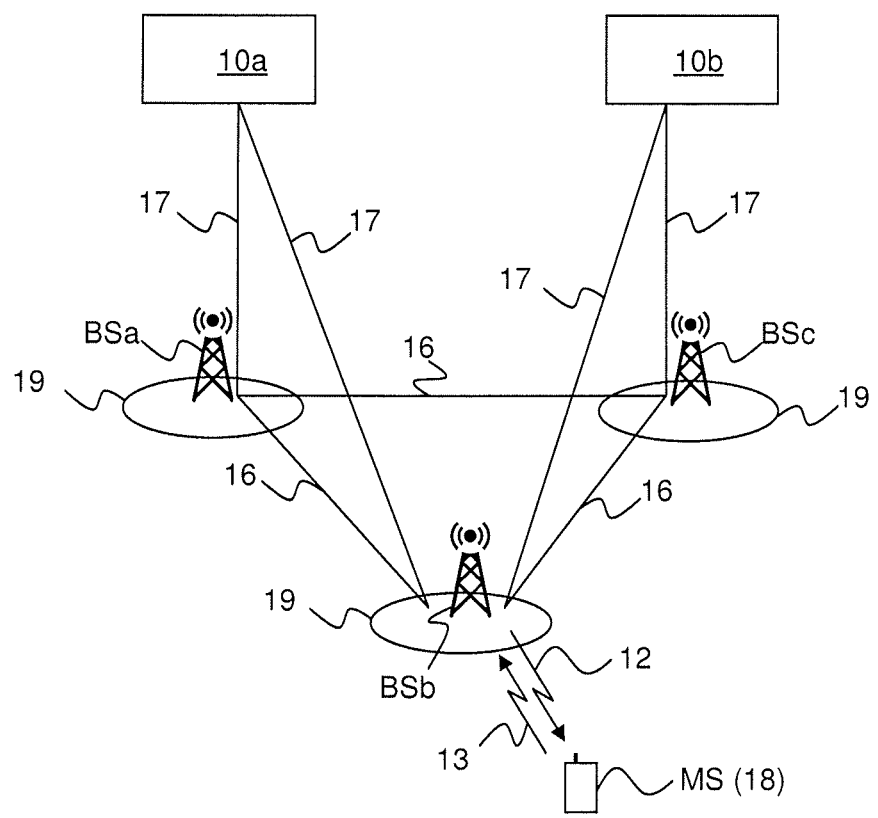
FIG. 1 shows a communication network architecture according to the present invention.
Figure 2:
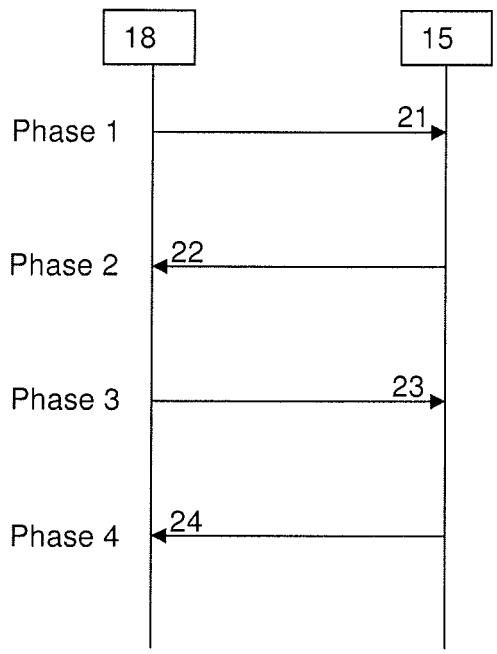
FIG. 2 illustrates a random access procedure in case of initial access.
Figure 3:
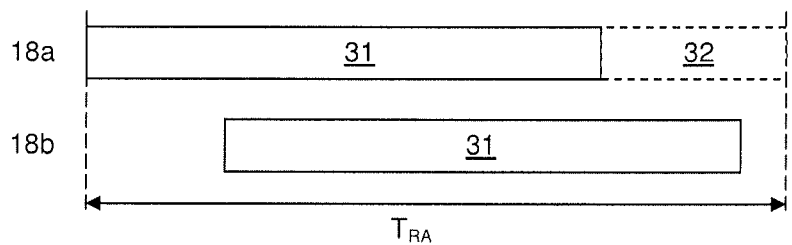
FIG. 3 shows an access burst timing for two user equipments.
Figure 4:
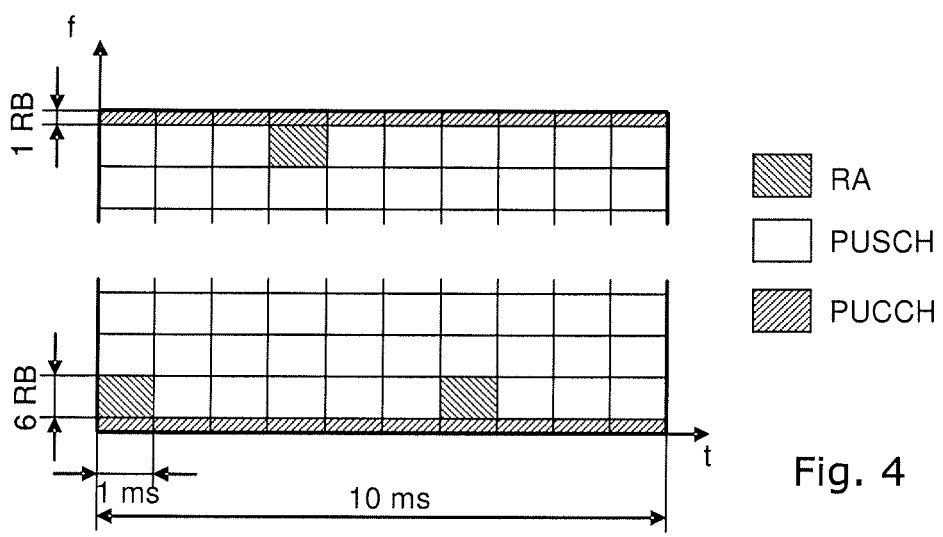
FIG. 4 shows the time-frequency structure of non-synchronized RA for FDD.
Figure 5A:
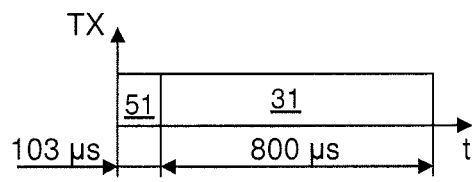
FIG. 5a shows the random-access preambles defined by 3GPP according to a first format.
Figure 5B:
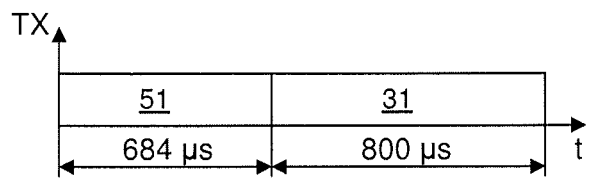
FIG. 5b shows the random-access preambles defined by 3GPP according to a second format.
Figure 5C:
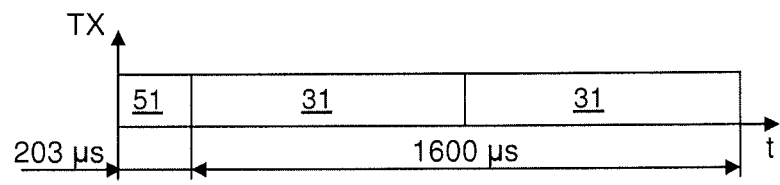
FIG. 5c shows the random-access preambles defined by 3GPP according to a third format.
Figure 5D:
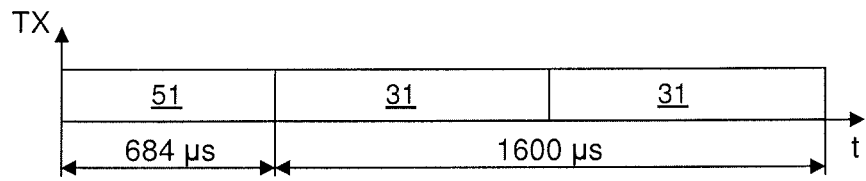
FIG. 5d shows the random-access preambles defined by 3GPP according to a fourth format.
Figure 6A:
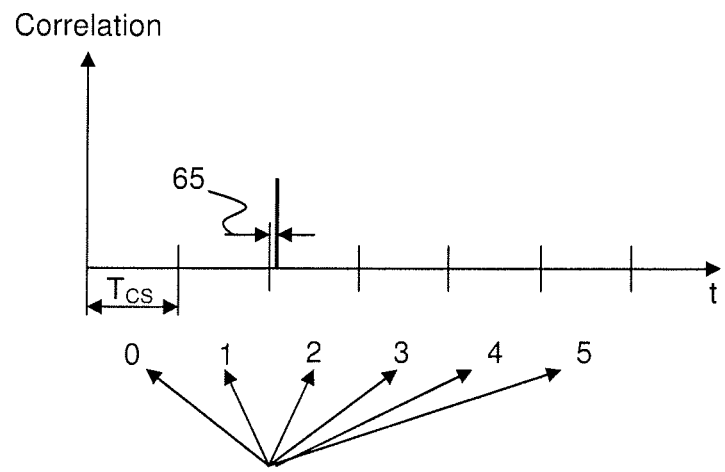
FIG. 6a shows the correlation peak when the MS is close to Node B.
Figure 6B:
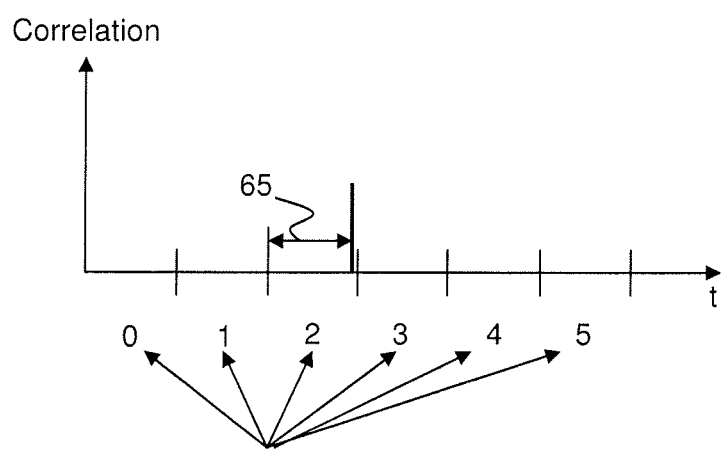
FIG. 6b shows the correlation peak when the MS is almost at the cell border.
Figure 7:
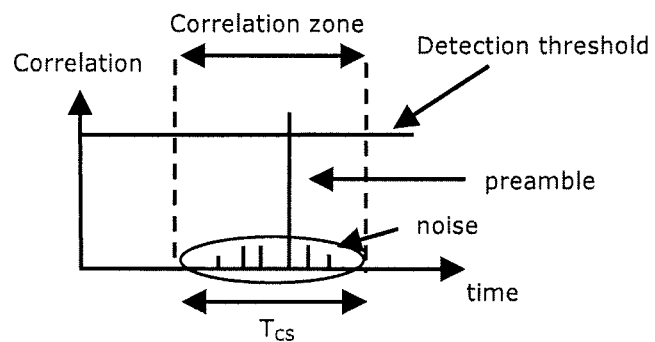
FIG. 7 illustrates correlation between received signal and root sequences.

A communication system, such as a Long Term Evolution (LTE) system is shown in FIG. 1, including a Radio Access Network (RAN), comprising at least one Radio Base Station (RBS) (or eNode B) BSa, BSb and BSc. The eNode Bs are connected over an interface such as the S1-interface 17 to at least one server gateway and mobility management entity node (S-GW/MME) 10a and 10b. The S-GW/MME node handles control signalling for instance for mobility, and is connected to external networks (not shown in FIG. 1) such as the Public Switched Telephone Network (PSTN) or the Integrated Services Digital Network (ISDN), and/or a connectionless external network as the Internet.

The RAN provides communication and control for a plurality of user equipments (MS) 18 (only one shown in FIG. 1) and each RBS BSa-BSc is serving at least one cell 19 through and in which the MSs 18 are moving. The RBSs BSa-BSc are communicating with each other over a communication interface 16, such as X2. The MSs each uses downlink (DL) channels 12 and uplink (UL) channels 13 to communicate with at least one RBS over a radio or air interface.

According to a preferred embodiment of the present invention, the communication system is herein described as an LTE system. The skilled person, however, realizes that the inventive method and arrangement work very well on other communications systems as well. User equipments are herein referred to as mobile stations such as mobile telephones ("cellular" telephones) and laptops with mobile termination and thus can be, for example, portable, pocket, hand-held, computer-included or car-mounted mobile devices which communicate voice and/or data with the RAN.

Detection Miss Probability

The following definition of the detection miss probability of order C, $P_m(C)$ is introduced, wherein $$P_m(C)=P(N>C)=1-P(N \le C)$$

Where N denotes the number of transmission attempts required for the preamble to be detected. The probability $P_m(C)$ is, thus, the probability that the MS needs more than C transmission attempts. It is natural to describe the RACH performance requirements in terms of $P_m(C)$. For example, the requirements could relate to two different orders of C:

1. The probability that the first transmission attempt is unsuccessful should be at most $R_m(1)$, e.g. 50%.

$$P_m(1) \le R_m(1)=0.50$$

2. The probability that the detection is still unsuccessful after $C_2$ attempts should be at most $R_m(C_2)$, e.g. 5%.

$$P_m(C_2) \le R_m(C_2)=0.05$$

The values and orders could of course be changed arbitrarily. In general, any number of orders may be used, e.g. the requirements may relate to four different orders, where the probability that detection is unsuccessful after $C_1, C_2, C_3$, and $C_4$ transmissions should be at most $R_m(C_1), R_m(C_2), R_m(C_3)$ and $R_m(C_4)$, respectively.

Access Probability

The access probability after attempt C, $P_a(C)$, is defined as the probability that the $C^{th}$ preamble transmission attempt or earlier is successful and contention free. The probability $P_a(C)$ is, thus, the probability that the MS needs at most C preamble transmission attempts for obtaining access. Similar to detection miss probability, it is natural to describe the RACH performance requirements in terms of $P_a(C)$. For example, the requirements could relate to two different orders of C:

1. The probability that the first preamble transmission attempt is successful and contention free should be at least $R_a(1)$, e.g. 50%.

$$P_a(1) \ge R_a(1)=0.50$$

2. The probability that $C_2$ preamble transmission attempts or less are needed for obtaining access is at least $R_a(C_2)$, e.g. 99%.

$$P_a(C_2) \ge R_a(C_2)=0.99$$

The values and orders could of course be changed arbitrarily. In general, any number of orders may be used, e.g. the requirements may relate to four different orders, where the probability that access is granted after $C_1$, $C_2$, $C_3$, and $C_4$ transmissions should be at least $R_a(C_1)$, $R_a(C_2)$, $R_a(C_3)$ and $R_a(C_4)$, respectively.

Similarly, the inaccess probability $P_{ia}(C)$ is defined as $$P_{ia}(C)=1-P_a(C).$$

False Detection Probability

The false detection probability $P_f$ should be less or equal to $R_f$, i.e. $P_f \leq R_f$.

Solution Overview

Figure 8:
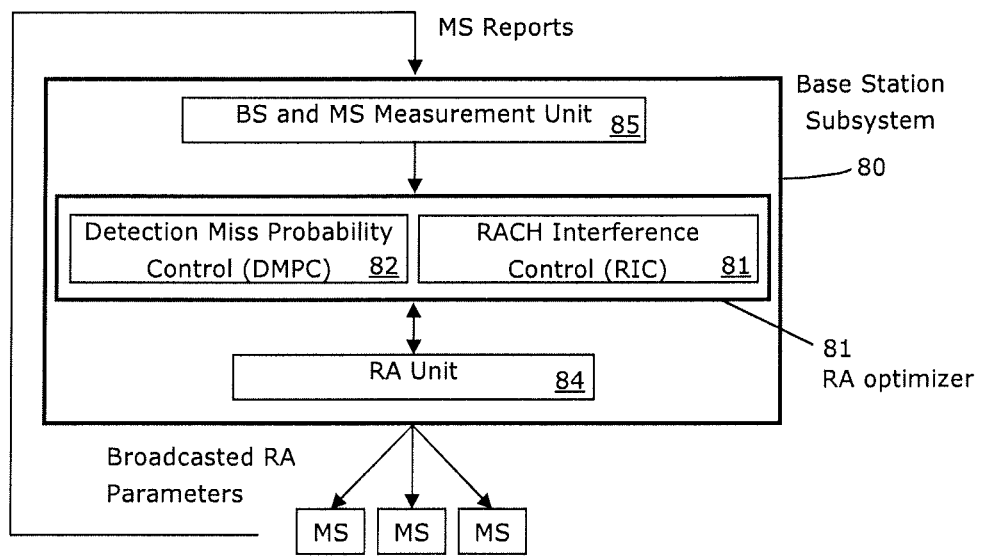
FIG. 8 depicts a system view of the constituents of an example of the arrangement according to the invention.

A solution according to the invention is an RA Optimizer consisting of two parts, namely (i) Detection Miss Probability Control (DMPC) and (ii) RACH Interference Control (RIC), see FIG. 8. A measurement unit gathers BS measurements and MS reports, and outputs measurements to the RA Optimizer consisting of DMPC and RIC.

A similar solution based on Access Probability Control (APC) is obtained by reusing the same structure as DMPC, but using inaccess probability estimates ($P_{ia}$) instead of detection miss probability estimates (detection miss ratios). Moreover, an RA optimizer as a combination of APC and RIC can be designed, similar to the RA optimizer consisting of DMPC and RIC.

Throughout this invention, we let RA parameters refer to all parameters involved in RA at the BS and the MS, including but not limited to, RACH power control parameters, the RACH configuration, RACH persistence parameters, and RACH format.

Let a preamble correlation peak be a correlation peak due to a preamble sent by an MS. The set of preamble correlation peaks is, thus, a subset of all correlation peaks observed at the BS. DMPC alters the distribution of the preamble correlation peaks such that the detection miss probability equals a given requirement. The distribution of the preamble correlation peaks is modified by for example altering the mean amplitude of the preamble correlations. The detection miss probability or the portion of the preamble correlations that fall below the detection threshold, decreases as the mean amplitude of the preamble correlations increases and vice versa. In general, however, DMPC changes the distribution of the preamble correlation peaks by adjusting a multitude of RA parameters.

The second component of the RA Optimizer is RIC which aims at minimizing the interference caused by random access. This is done by decreasing the detection threshold as much as possible still satisfying requirements on false detection probability.

The results of the RA Optimizer are forwarded to the RA unit, which implements the RA functionality, e.g., broadcasting RA information to MSs, receiving and processing preambles sent by MSs, computing timing advance, and executing collision resolution. It should be clear to anyone skilled in the art what the functionality of the RA unit comprises. The input to the RA unit comprises RA parameters, some of which are then broadcasted. This is followed by a new round of measurement processing, execution of DMPC and RIC and so on.

An example is given below. This is followed by the description of DMPC and the RIC, and finally how DMPC and RIC are combined.

Example supported by FIG. 8 illustrating the main aspects of the invention:

Let us start with a situation where the RA parameters in a cell are poorly tuned, resulting in a relatively high detection miss probability and/or high interference caused by RACH. We will see, throughout this example, how the detection miss probability and the RACH generated interference may be decreased.

Figure 9:
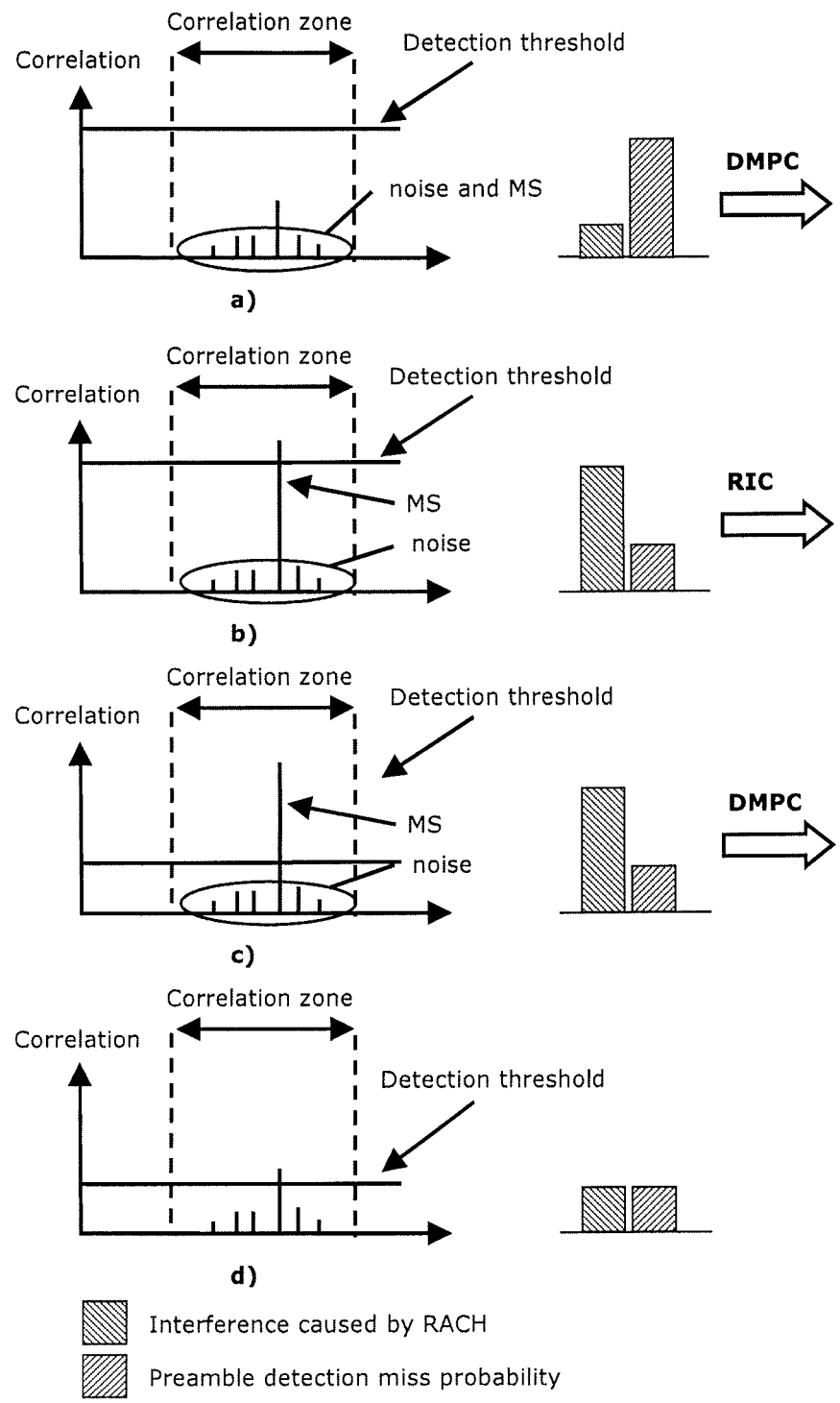
FIGS. 9a-9d illustrate cases of the interaction between DMPC and RIC.

Consider a case a), FIG. 9a, where the MSs send preambles with a too low power. This results in a detection miss probability greater than the given requirement, resulting in DMPC to tune RA such that the detection miss probability is decreased. Effectively, the DMPC tunes those RA parameters that affect the distribution of the preamble correlation peaks and, thus, the detection miss probability. By for example increasing, in a case b), the desired target receive power $P_{0\_RACH}$, MSs send preambles with a higher power, thus, increasing the correlation and the probability of detecting a preamble, as shown in FIG. 9b.

At this point we have satisfied the detection miss probability requirement. However, the interference caused by RACH is overly high. As noted in case b) preamble correlation peaks are significantly higher than peaks due to noise and, as such, the detection threshold may be lowered using RIC, as shown in case c) illustrated in FIG. 9c. This is then followed by one or several DMPC execution(s) resulting in a change in the preamble distribution, see FIG. 9d representing case d). One of the results of DMPC is that MSs will transmit preambles with lower power and/or that the MSs will send fewer preamble retransmissions and, consequently, the interference generated by MSs performing random access is decreased.

In conclusion, RA parameters are tuned in order to meet detection miss probability requirements and to lower the interference caused by MSs performing random access.

Detection Miss Probability Control

A First Embodiment of Detection Miss Probability Control

Figure 10:
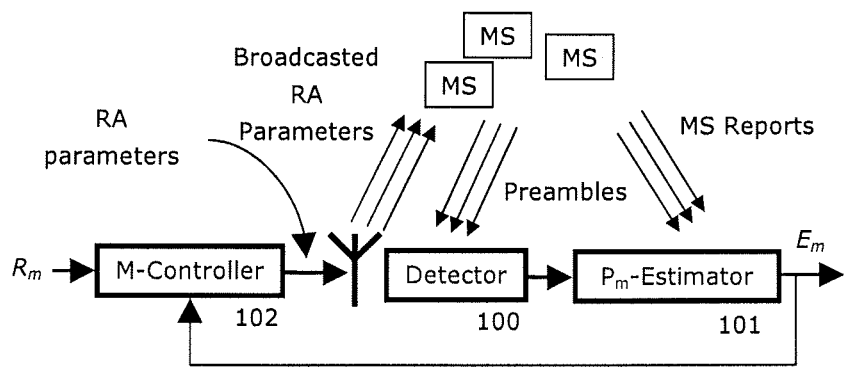
FIG. 10 outlines a first embodiment of detection miss probability control.

In the following we sometimes drop the notation C when relating to $P_m(C)$ and $R_m(C)$. The general approach is presented in FIG. 10. It may not be possible to accurately determine $P_m(C)$ and in general we resort to estimations of $P_m(C)$, which we hereafter denote with $E_m(C)$. The output of the $P_m$-Estimator is together with $R_m$ fed into a controller (referred to as the M-Controller), which alters necessary RA parameters in order for $E_m$ to equal $R_m$. The SINR (Signal to Interference Noise Ratio) of the received preambles may be used by the M-Controller in order to react faster to changes in interference.

The output of the M-Controller are then broadcasted to the MS(s) in the area covered by the BS. MSs receive the broadcasted RA information and adhere to updates of the RA parameters, e.g., RACH power control parameters and RACH persistence parameters. MSs may send RA-specific reports to the BS in order to aid $P_m$ estimation.

The M-Controller forces $E_m(C)$ to converge to $R_m(C)$ or to the vicinity of $R_m(C)$. This is done by adjusting RA parameters and thereby altering the distribution of the preamble correlation peaks such that $E_m(C)$ satisfies $R_m(C)$.

The $P_m$-Estimator

First Embodiment of the $P_m$-Estimator

Figure 11:
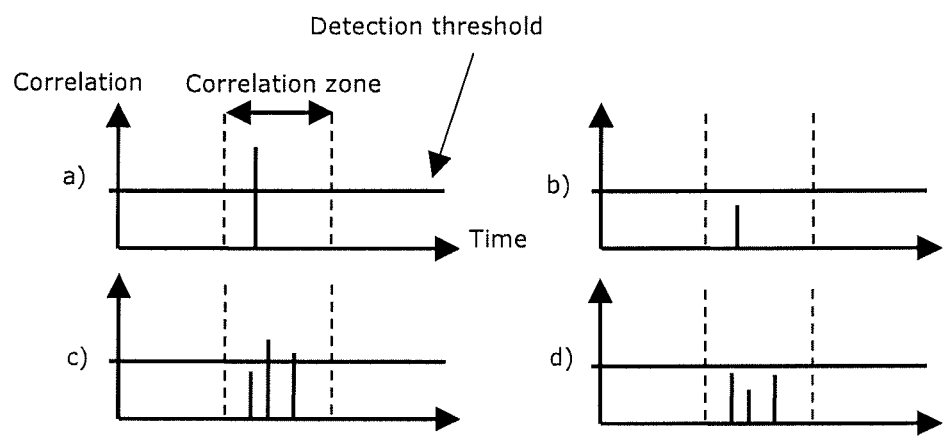
FIG. 11 shows cases with detections and detection misses.

FIG. 11 shows four different cases of multiple MSs performing random access. Case a) shows that different RA slot and preambles are used and we have good SNR resulting in a detection of the preamble. Case b) shows that different RA slot and preambles are used and we have poor SNR resulting in a detection miss. Case c) shows that the same RA slot and preamble is used and some preambles have good SNR while other have poor SNR, resulting in a preamble detection. Case d) shows that the same RA slot and preamble are used and we have poor SNR resulting in a detection miss. Cases a) and c) will result in a preamble detection and the BS sending an RA Response message to the MS(s). Cases b) and d) will result in a detection miss and, consequently, the BS will not send a RA Response message to the MS(s). Due to the lack of an RA response message from the BS (cases b) and d)), the MS(s) will retransmit the preamble using a higher transmission power.

The MS stores information related to preamble transmissions and reports this to the BS once the MS is granted access to the network, i.e., the last step of the RA procedure has been successfully executed. Let i denote a successfully executed RA starting with the initial preamble transmission and ending with the network access grant (involving several potential preamble retransmissions and contention resolution failures). Let $N_i$ be the number of transmission attempts during RA i.

By gathering the reported $N_j$ over some time, it is possible to estimate the detection miss probability $P_m(C)$ for a certain attempt number C. This can be done in a numerous different ways, e.g., by forming a histogram over the reported $N_j$.

A core of the first embodiment is a method in a communication system comprising of:
 gathering and processing measurements from mobile stations and/or base station, where the measurements consist of a number of preamble transmission attempts reported by mobile stations.
 tuning of RA parameters based on these measurements such that the preamble detection miss probability of mobile stations performing RA satisfies the given requirements, where the tuned RA parameters comprise RA parameters that affect the distribution of the preamble correlation.

A Second Embodiment of Detection Miss Probability Control.

Figure 12:
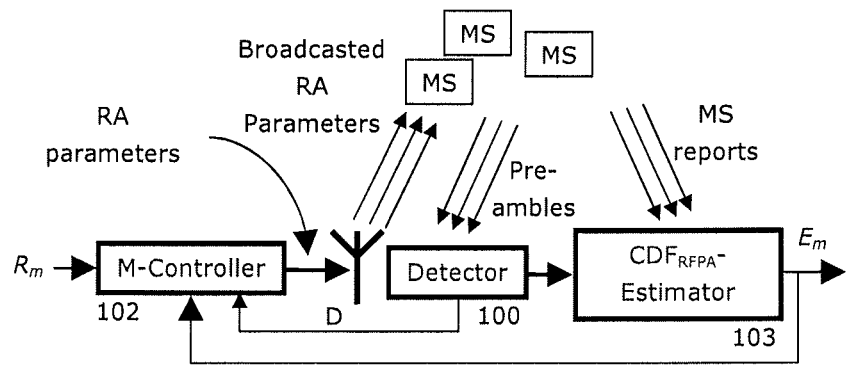
FIG. 12 outlines a second embodiment of detection miss probability control.

The outline of the second embodiment is illustrated in FIG. 12 and is further described here.

Figure 13A:
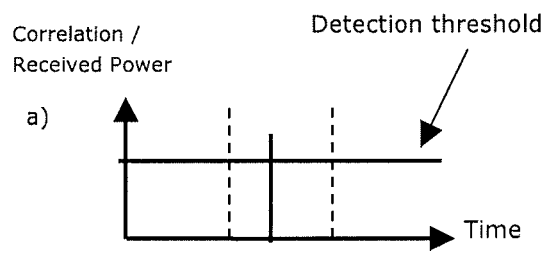
FIGS. 13a and 13b illustrate examples of estimation of Received Power First Attempt (RFPA).

The situation after a successful detection is illustrated by FIG. 13a. Let i denote a successfully executed RA starting with the initial preamble transmission and ending with the network access grant (involving several potential preamble retransmissions and contention resolution failures). When the MS has reported the needed number of transmission attempts $N_i$ during RA i, it is possible to calculate the corresponding received power for a first transmission attempt at exactly the same conditions, except at a $(N_i-1)\Delta_{RACH}$ dB lower transmission power. This is described by FIG. 13b.

Figure 13B:
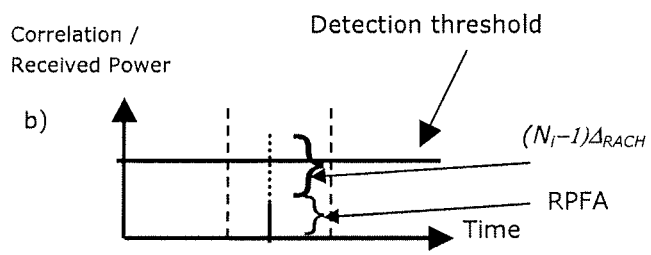

FIGS. 13a and 13b illustrate the estimation of the Received Power First Attempt (RPFA).
a) The situation after successful detection—the received power of the preamble sequence exceeds the detection threshold.
b) Using knowledge about the number of needed transmission attempts and the power ramping step, it is possible to estimate the power of the first preamble, RPFA.

Gathering RPFA as described in FIG. 13 for all MSs in a cell for a certain time enables estimation of the RPFA distribution for users in the cell coverage area. Such a distribution is depicted in FIG. 14.

Figure 14:
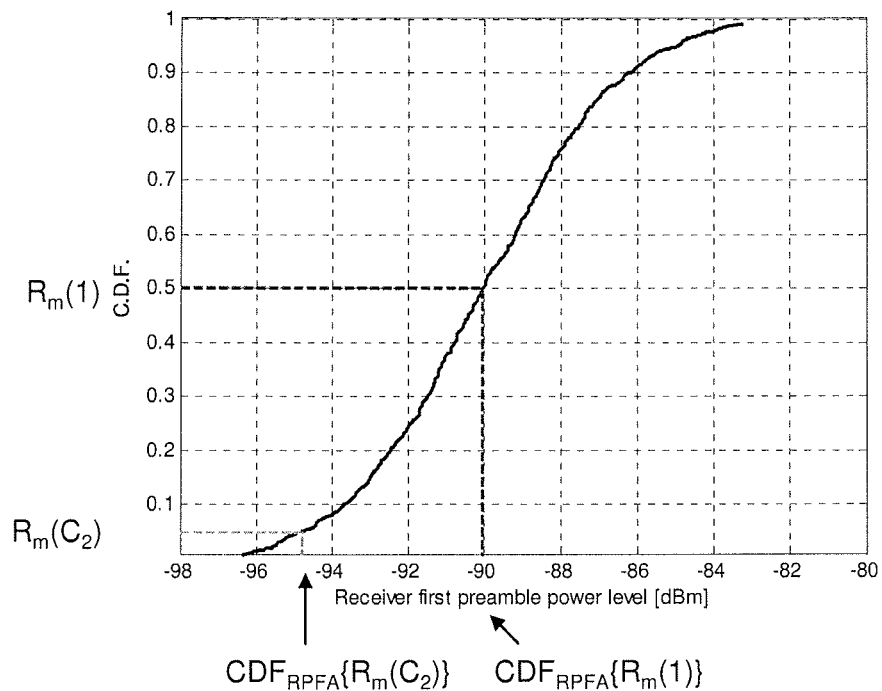
FIG. 14 shows a curve disclosing the cumulative distribution of the estimated received power of the first RFPA.

FIG. 14 diagrammatically shows a cumulative distribution of the estimated received power of the first transmission attempt, RPFA. Also indicated are the $R_m(1)$- and $R_m(C_2)$-percentiles, denoted $CDF_{RPFA}(R_m(1))$ and $CDF_{RPFA}(R_m(C_2))$, respectively.

The RPFA data has been gathered during a time with a particular setting of the detection threshold D, $P_{0\_RACH}$, and $\Delta_{RACH}$. This data will be used together with the requirements $R_m(1)$ and $R_m(C_2)$ to adjust $P_{0\_RACH}$ and $\Delta_{RACH}$.

$P_{0\_RACH}$ adjustment based on current $P_{0\_RACH}$, detection threshold, $R_m(1)$ and observed RPFA distribution:
In essence, the ambition is that the detection threshold (in terms of received preamble power) should be same as the $R_m(1)$-percentile of the RPFA data. This is the same as the first requirement would have been fulfilled during the time of observation.

Let D be the detection threshold. This could be described by the following adjustment mechanism, $$P_{0\_RACH,new}=P_{0\_RACH,current}+(D-CDF_{RPFA}(R_m(1))).$$

If the $R_m(1)$-percentile of the received power $CDF_{RPFA}(R_m(1))$ is greater than the detection threshold D, then the new level of $P_{0\_RACH}$ shall be lower than the current level. In contrast, if this percentile is less than the detection threshold, then the new level of $P_{0\_RACH}$ shall be higher than the current level.

Recall from a previous section that the parameter $P_{0\_RACH}$ is represented by 4-bits and can thus take 16 different values with a 2 dB difference between each value. In case $P_{0\_RACH,new}$ falls between two such values, then we may use the closest upper value or use the closest value.

$\Delta_{RACH}$ adjustment based on current $P_{0\_RACH}$, detection threshold, $R_m(1)$ and observed RPFA distribution:
The RPFA data describes the variations in a particular cell with respect to uplink and downlink gain imbalances, since the uplink preamble power is set by the MS based on downlink measurements of the path gain. It also contains variations due to interference variations, since spurious interference may cause preamble retransmissions, and the number of retransmission attempts $N_i$, is used when calculating the RPFA. Some cells may have a large variation in RFPA, which means that the ramping step $\Delta_{RACH}$ also needs to be large in order to keep the number of transmission attempts at a desired level. Conversely, cells with small variations needs a small ramping step $\Delta_{RACH}$, in order to meet the requirements.

The central requirement when determining the ramping step $\Delta_{RACH}$ is the $R_m(C_2)$, which specifies the probability that the transmission is successful after at least $C_2$ transmissions. The transmission power will increase from the first attempt to attempt $C_2$ by the power $(C_2-1)\Delta_{RACH}$. This means that $\Delta_{RACH}$ should be large enough to make the received power after attempt $C_2$ to be greater than the detection threshold in all cases except $R_m(C_2)$. Thus, the ramping step can be calculated as $$\Delta_{RACH,new}=(D-CDF_{RPFA}(R_m(C_2)))/(C_2-1).$$

The new value of $\Delta_{RACH}$ increases as the difference between the detection threshold D and the $R_m(C_2)$-percentile of the received power $CDF_{RPFA}(R_m(C_2))$ increases. The new value of the ramping step $\Delta_{RACH}$ times the number of additional retransmissions $(C_2-1)$ must bring this percentile level beyond the detection threshold.

In case there are requirements for several orders defined, then we form the maximum over $\Delta_{RACH}$ computations for each order, i.e., $$\Delta_{RACH,new} = \max \begin{pmatrix} (D-CDF_{RPFA}(R_mC_2))/(C_2-1) \\ (D-CDF_{RPFA}(R_mC_3))/(C_3-1) \\ (D-CDF_{RPFA}(R_mC_4))/(C_4-1) \\ \ldots \end{pmatrix}$$

The new value of the ramping step $\Delta_{RACH}$ times the number of additional retransmissions $(C_j-1)$, where $j>2$ must bring $CDF_{RPFA}(R_m(C_j))$ beyond the detection threshold D.

Recall from a previous section that $\Delta_{RACH}$ can take four different values where the difference between each value is 2 dB. In case the computed $\Delta_{RACH,new}$ falls between two such values (e.g., 2 dB<$\Delta_{RACH,new}$=2.5 dB<4 dB) then we may choose the closest upper value ($\Delta_{RACH,new}$=4 dB) or the closest value ($\Delta_{RACH,new}$=2 dB).

Core of the Second Embodiment

In this embodiment, the adjustments of the detection threshold, the desired target received power $P_{0\_RACH}$ and the ramping step $\Delta_{RACH}$ are separated from each other. The detection threshold is assumed to be modified by any of the other suggestions presented in the present description. The following steps describe how observed data is used to adjust the desired target received power and the ramping step:

- Use reports from the MS about needed transmission attempts and knowledge of the current ramping step to adjust the received power estimates to the corresponding received power for a first attempt.
- Gather data from all random accesses during a certain time to compile an estimate of the distribution of the received power, first attempt.
- Use the detection threshold level, current level of $P_{0\_RACH}$, the miss detection probability after one transmission attempt and the distribution of the received power first attempt to determine a new level of $P_{0\_RACH}$.
- From the distribution, extract the percentile corresponding to the required miss detection probability. If this percentile is greater than the detection threshold, then the new level of $P_{0\_RACH}$ shall be lower than the current level. If this percentile is less than the detection threshold, then the new level of $P_{0\_RACH}$ shall be higher than the current level.
- Use the detection threshold level, the miss detection probability after $C_2$ transmission attempt and the distribution of the received power first attempt to determine a new level of $\Delta_{RACH}$.
- From the distribution, extract the percentile corresponding to the required miss detection probability. The ramping step $\Delta_{RACH}$ times the number of additional retransmissions ($C_2$−1) must bring this percentile level beyond the detection threshold.

RACH Interference Control

Figure 15:
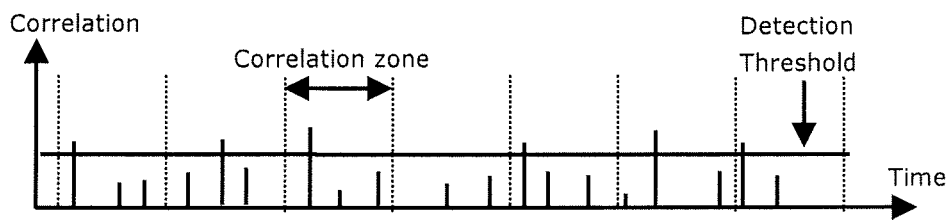
FIG. 15 shows the amplitude of correlation peaks caused by noise.

The second component of this invention is the RIC, see FIG. 8. The aim of RIC is to reduce the interference caused by RACH by altering the detection threshold as described in FIG. 9. Assume the case where there are no preamble transmissions, i.e., the correlation peaks are due to noise solely. It may occur that the amplitude of one or several correlation peaks will be greater than the detection threshold, see FIG. 15, which shows that the amplitude of the correlation peaks caused by noise may be greater than the detection threshold.

Figure 16:
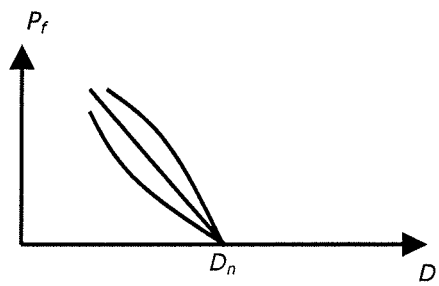
FIG. 16 is a curve showing the probability of a correlation peak due to noise.

The probability of a correlation peak due to noise to be above the detection threshold is denoted by $P_f$. The relationship between the detection threshold D and $P_f$ is given by $$P_f=0, D>D_n$$

$$P_f>0, D\leq D_n$$

where $D_n$ is the maximum correlation due to noise. In general, $P_f$ decreases as D increases as shown in FIG. 16. The actual shape of the curve and the location of $D_n$ depends on, e.g., interference and noise levels in own and neighbouring cells.

It is desired to decrease the detection threshold as much as possible, since this will in combination with DMPC described in a previous section decrease the interference caused by RACH. Decreasing the detection threshold will, however, increase the false detection probability $P_f$. In this invention it is assumed that a false detection probability of maximum $R_f>0$ is tolerated.

Figure 17:
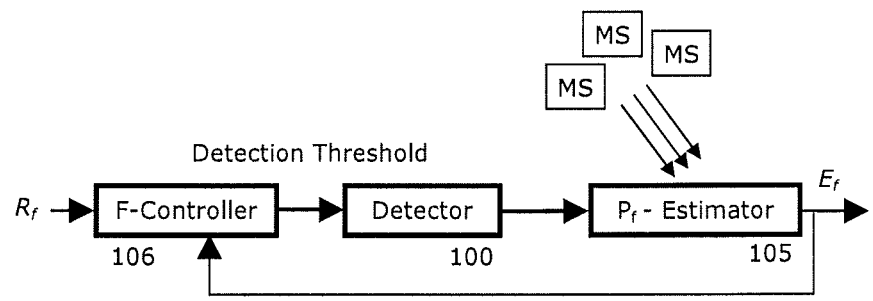
FIG. 17 shows the RIC loop.

The outline of the RIC method is given in FIG. 17, which shows the RIC loop. The estimated false detection probability $E_f$ is fed back into a controller (referred to as the F-Controller), which, given requirements on the maximum false detection probability $R_f$, computes a suitable detection threshold. The $P_f$-estimator may also use reports from MSs to estimate $P_f$.

The F-Controller alters the detection threshold D such that $E_f$ converges to $R_f$ or to the vicinity of $R_f$. It should be obvious for anyone skilled in the art that a wide range of techniques can be used in the F-Controller.

Embodiments of the $P_f$-Estimator are described below.

A First Embodiment of the $P_f$-Estimator

In said first embodiment of the $P_f$-Estimator the MSs report, when demanded by the BS, information regarding their random access attempts upon access to the network. For all the RA attempts from the first preamble until the network access is granted, an MS records the information needed to verify the validity of the correlation peak(s), generated by the preambles sent by the MS, in time and RA slot as observed at the BS. This includes but is not limited to (i) BS that the MS attempted access to, (ii) the RA slot ID (number) or the time interval, (iii) the preamble (root sequence and shift) used in each RA slot, and (iv) the timing advance received from the BS in the final and successful attempt. Here we assume that an MS has not changed its location considerably in the direction toward the BS, i.e., we assume that the round-trip time (and the timing advance) does not change significantly between the RA attempts (this may not be a valid assumption in a high-speed cell). The BS compares the correlation peaks above the detection threshold with those reconstructed using MS reports (discarding RA attempts with other BSs) and if a peak does not match that reported by all MSs, then that peak is found to be a false detection. This is illustrated in FIG. 18.

Figure 18:
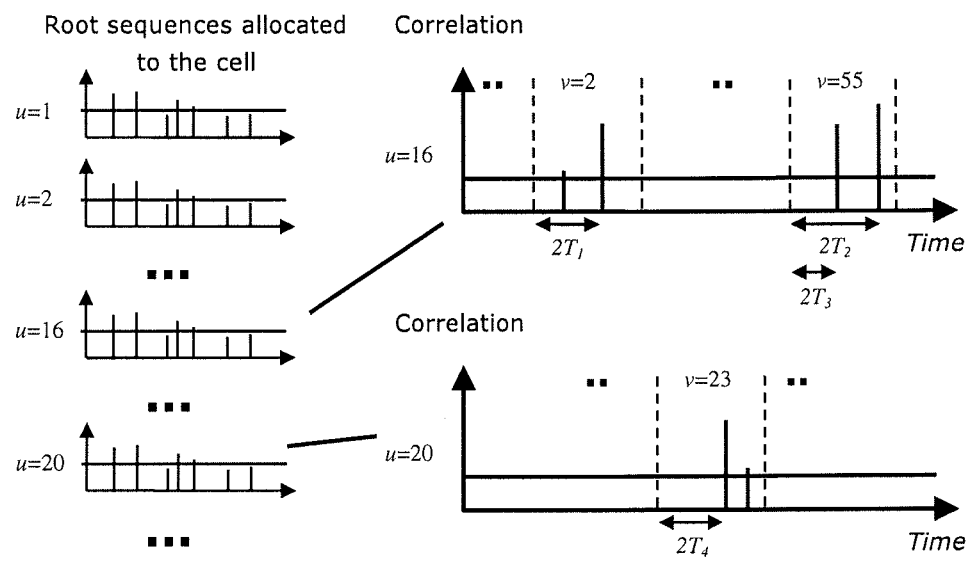
FIG. 18 shows correlations in a first mode of the $P_f$-estimator
Figure 19:
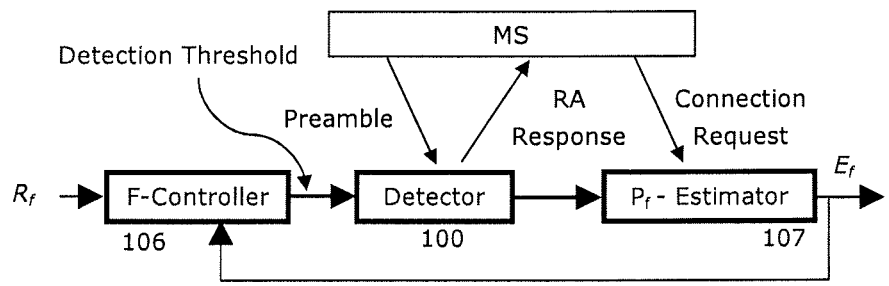
FIG. 19 illustrates a second mode of the $P_f$-estimator.

FIG. 18 shows that the root sequence index is denoted with u and the shift is denoted with v (see a previous section). Four MSs have reported their random access attempts. MS1 has reported use of preamble (u=16,v=2) and timing advance $T_1$, MS2 has reported use of preamble (u=16,v=55) and timing advance $T_2$, MS3 has reported use of preamble (u=16,v=55) and timing advance $T_3$, and MS4 has reported use of preamble (u=20,v=23) and timing advance $T_4$. Two peaks in preambles (u=16,v=2) and (u=20,v=23) are greater than the detection threshold and are, thus, concluded to be preamble detections. These peaks do, however, not match the MS reports and are therefore classified as false detections.

A Second Embodiment of the $P_f$-Estimator

In the second embodiment, the $P_f$-Estimator uses the messages between the MSs and the BS to estimate the false detection probability. Recall from a previous section that upon detection of a preamble the BS sends an RA esponse message to the MS(s) that have sent the preamble. The MS(s) that have sent the preamble in the first step reply by sending a Connection Request (CR) message. If no Connection Request message is received at the BS after an RA Response message has been sent to the MS(s), then this may be due to a false detection. This is shown in 19, where the RA Response messages and received Connection Request messages are fed into the $P_f$-Estimator.

Let $n_{RAR}$ be the number of sent RA Response (RAR) messages and $n_{CR}$ be the number of times where at least one Connection Request messages is received from MS(s) after a RA Response message has been sent.

Below we give two alternative false detection probability estimators denoted by $E_{f,1}$ and $E_{f,2}$. These two estimators differ in the type of input data that is needed to compute the estimate. The notation $E_f$ refers to either $E_{f,1}$ or $E_{f,2}$ throughout this invention.

The first estimator is given by $$E_f^{(1)} = 1 - \frac{n_{CR}}{n_{RAR}}$$

where $E_{f,1}$ increases as the ratio $n_{CR}/n_{RAR}$ decreases.

Messages between the MS and BS may be lost due to, e.g., high interference, and this gives an erroneous estimate of the false detection probability. Known message drop probabilities may be used to cancel out such bias. Let $P_{RAR}$ and $P_{CR}$ be the probability of dropping an RA Response message and a Connection Request message, respectively.

The second estimator is then given by, $$E_f^{(2)} = 1 - \frac{n_{CR}}{n_{RAR}(1-P_{CR})(1-P_{RAR})}.$$

where $E_{f,1}$ increases as the ratio $n_{CR}/n_{RAR}$ decreases, $P_{CR}$ decreases, and $P_{RAR}$ decreases.

Note if ARQ or HARQ is used when transmitting the Connection Request then $P_{CR}$ is defined as the probability that the first transmission and all subsequent retransmissions are dropped.

A Third Embodiment of the Pf-Estimator

In the third embodiment, the distribution of the correlation peaks is used to derive $E_f$. This corresponds to the approach presented in FIG. 17, where no MS reports are used and the correlation peaks are input to the $P_f$-Estimator. We want to set the detection threshold D such that the area under the noise distribution curve is less or equal to $R_f$ for correlations greater than D, see FIG. 20a. This means that the noise distribution must be estimated or approximated.

Figure 20:
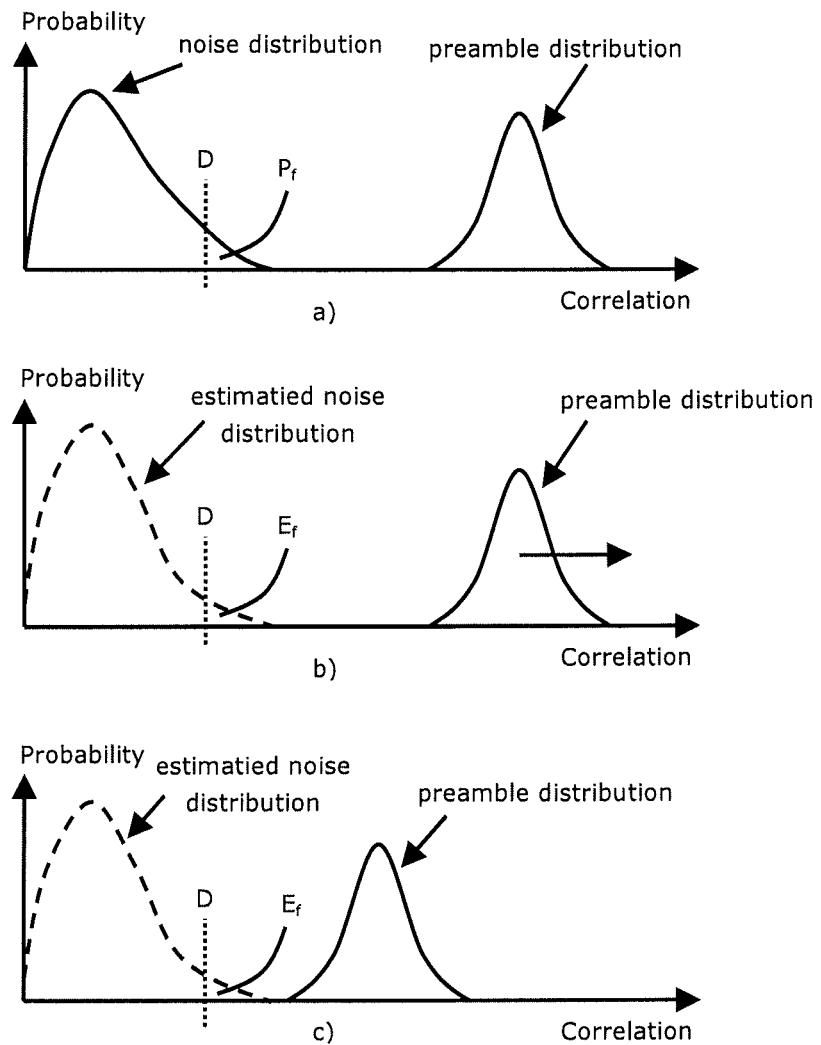

The noise distribution may be separated from the preamble distribution by tuning RA parameters, e.g., setting $P_{0\_RACH}$ to a high value, as shown in FIG. 20b. Having the two distributions separated we are able to estimate the noise distribution. The estimation can also include any knowledge of the noise distribution derived theoretically, by simulation, or using real life data. The noise and the preamble distributions may have to be separated from time to time to estimate the noise distribution.

The noise distribution may also be estimated by utilizing knowledge of the noise distribution derived theoretically, by simulation, or using real life data, as shown in FIG. 20c. An expected or predicted noise distribution may be used directly. Alternatively, the form or structure of an expected or predicted noise distribution may be fitted to observed data producing an estimate of the noise distribution. This does not require a separation of the noise and the preamble distribution.

Combining DMPC and RIC

DMPC and RIC must co-exist in order to minimize the interference caused by RACH and satisfy requirements on detection miss probability. DMPC and RIC are, however, coupled in that RIC alters the detection threshold D which in turn influences the detection miss probability as shown in FIG. 21. For this reason there is a need of a coordinator that manages and controls the execution of the M-Controller and the F-Controller. For a given D it will take some time for $E_m$ to converge to $R_m$. More specifically, the difference between $E_m$ and $R_m$ decreases each time the M-Controller executes. As such, the execution of the F-Controller should be followed by a series of executions of the M-Controller.

In a previous section it was mentioned that the preamble and the noise distributions may be separated in order to estimate the noise distribution. For this reason it is necessary to put the M-Controller in a mode resulting in a separation of the noise and the preamble distributions. In this mode, the $P_m$-Estimator is turned off.

The sampling period T over which $E_m$ and $E_f$ are computed may be fixed or vary based on the amount of available data which is used to compute $E_m$ and $E_f$.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

Abbreviations:
APC Access Probability Controller
ARQ Automatic Repeat Request
BS Base Station
DL Downlink
DMPC Detection Miss Probability Controller
E-UTRAN Evolved Universal Terrestrial Radio Access Network
HO Hand Over
LTE Long Term Evolution
MS Mobile Station
RA Random Access
RACH Random Access Channel
RIC RACH Interference Control
UL Uplink
UL-SCH Uplink Shared Channel

The invention claimed is:

1. A method for satisfying random access attempt success requirements of a random access channel (RACH) used by a mobile station (MS) for accessing a communication network accessible in a communication cell served by a radio base station (BS), said mobile station (MS) communicating on uplink and downlink channels, the method comprising the steps of:
   gathering data during a time period, the data including a number of preamble transmission attempts to the base station made by the mobile station in order to perform a successfully executed random access to the base station,
   estimating quantities, including a false detection probability, related to random access attempt success statistics in said cell based on the gathered data,
   tuning random access parameters such that said estimated quantities related to random access attempt success statistics satisfy predetermined random access attempt success requirements, and
   using said false detection probability and requirements on a maximum false detection probability to compute a detection threshold.

2. The method according to claim 1, wherein said quantities related to random access attempt success statistics further comprise detection miss probability, access delay, or access probability.

3. The method according to claim 1, wherein said quantities related to random access attempt success statistics comprise a detection miss probability based on the number of preamble transmission attempts.

4. The method according to claim 1, wherein said period is fixed or varying according to the amount of data needed to estimate said quantities.

5. The method according to claim 1, wherein said false detection probability estimating includes the steps of:
receiving reports from the mobile station including information needed to verify a validity of a correlation peak generated by preambles sent by the mobile station in time and random access slot as observed at the base station,
comparing at the base station correlation peaks above the detection threshold with correlation peaks reconstructed using said mobile station reports, and
judging a correlation peak to be a false detection if said peak does not match that reported by multiple mobile stations.

6. The method according to claim 1, wherein said estimating includes the steps of:
detecting a preamble sent from a mobile station,
sending an random access response message to said mobile station, and
estimating, if no connection request message is received at the base station after a random access response message had been sent, the false detection probability.

7. The method according to claim 6, further including the step of:
performing said estimation of the false detection probability by use of the equation $$E_f^{(1)} = 1 - \frac{n_{CR}}{n_{RAR}},$$

where $E_f^{(1)}$ increases as the ratio $n_{CR}/n_{RAR}$ decreases wherein $n_{RAR}$ is the number of sent random access (RA) response (RAR) messages and $n_{CR}$ is the number of times where at least one connection request (CR) message is received from the mobile station after an RA response message has been sent.

8. The method according to claim 6, further including the step of:
performing said estimation of the false detection probability by use of the equation $$E_f^{(2)} = 1 - \frac{n_{CR}}{n_{RAR}(1 - P_{CR})(1 - P_{RAR})},$$

where $E_f^{(2)}$ increases as the ratio $n_{CR}/n_{RAR}$ decreases, $P_{CR}$ decreases, and $P_{RAR}$ decreases, wherein $n_{RAR}$ is the number of sent random access (RA) response (RAR) messages and $n_{CR}$ is the number of times where at least one connection request (CR) message is received from the mobile station after an RA response message has been sent, $P_{RAR}$ is the probability of dropping an RA response message, and $P_{CR}$ is the probability of dropping a connection request message.

9. The method according to claim 1, wherein said false detection probability estimation includes the steps of:
using correlation peaks due to noise as input for false detection probability estimation, and
computing a new value of the detection threshold D such that said estimated false detection probability $E_f$ is less than a maximum false detection probability $R_f$.

10. The method according to claim 9, further including the steps of:
processing the estimated false detection probability $E_f$,
computing a new value of the detection threshold D such that said estimated false detection probability $E_f$ is less than a maximum false detection probability $R_f$,
processing the estimated detection miss probability $E_m$, and
after each execution of a new value of the detection threshold D, computing new random access parameters such that said estimated detection miss probability $E_m$ satisfies given requirements.

11. The method in claim 1, wherein the predetermined random access attempt success requirements include an access probability or access delay requirement.

12. The method in claim 1, wherein the data gathering comprises requesting a report from the mobile station including a number of preamble transmission attempts to the base station made by the mobile station in order to perform a successfully executed random access to the base station.

13. A method for satisfying random access attempt success requirements of a random access channel (RACH) used by a mobile station (MS) for accessing a communication network accessible in a communication cell served by a radio base station (BS), said mobile station(MS) communicating on uplink and downlink channels,
the method comprising the steps of:
gathering data during a time period, the data including a number of preamble transmission attempts to the base station made by the mobile station in order to perform a successfully executed ramdom access to the base station,
estimating quantities related to random access attempt success statistics in said cell based on the gathered data, and
tuning random access parameters such that said estimated quantities related to random access attempt success statistics statisfy predetermined random access attempt success requirements,
wherein said tuning of random access parameters includes the steps of:
using reports from the MS about the number of preamble transmission attempts and knowledge of a current MS transmit power ramping step to adjust received power estimates for the MS to a corresponding received power for a first random access attempt,
gathering data from all random accesses during a certain time to compile an estimate of a distribution of the received power for a first random access attempt,
using a detection threshold level level of a desired target receive random access power, a detection miss probability after one transmission attempt, and a cumulative distribution of the received power first random access attempt to determine a new level of said desired target receive random access power.

14. The method according to claim 13, further comprising the step of:
using the detection threshold level, the detection miss probability after a second random access transmission attempt, and a distribution of the received power first random access attempt to determine a new level of the current MS transmit power ramping step.

15. A communication network node for enabling tuning of a random access channel used by a mobile station (MS) when requesting access to a communication network system in a communication cell served by a radio base station (BS), the mobile station and base station communicating on uplink and downlink channels, the communication network node comprising:
- a storage unit configured to gather data during a time period, the data including a number of preamble transmission attempts to the base station made by the mobile station in order to perform a successfully executed random access to the base station, and
- a Random Access (RA)optimizing processor, connected to the storage unit, configured to:
  - estimate quantities, including a false detection probability, related to random access attempt success statistics in said cell based on the gathered data, and
  - tune random access parameters such that said estimated quantities related to random access attempt success statistics satisfy predetermined requirements, and
  - use said false detection probability and requirements on a maximum false detection probabiiity to compute a detection threshold.

16. The network node according to claim 15, wherein said quantities related to random access attempt success statistics comprise detection miss probability, access delay, or access probability.

17. The network node according to claim 15, wherein said quantities related to random access attempt success statistics comprise a detection miss probability based on the number of preamble transmission attempts.

18. The communication network node according to claim 15, wherein said RA optimizing processor is configured to:
- control quantities related to success statistics of station random access attempts in said cell, and
- reduce an interference generated by Random Access Channels (RACH) when mobile stations attempt access to said cell.

19. The communication network node according to claim 15, wherein said RA optimizing processor is configured to:
- receive preambles from mobile stations attempting access in said cell,
- estimate a value, $E_m$, of the probability of a detection miss ($P_m$),
- force said estimated value, $E_m$, of a probability of a detection miss to converge to a predetermined value of a detection threshold, $R_m$, and
- wherein the communication network node further comprises broadcast circuitry configured to broadcast, using one or more antennas, said tuned RA parameters to the mobile stations in an area covered by the base station.

20. The communication network node according to claim 19, wherein said RA optimizing processor is configured to:
- estimate a cumulative distribution of estimated received power $CDF_{RFPA}$ of a first transmission attempt of a mobile station,
- compute a new value of the received power, $P_{0\_RACH,new}$, based on the current level of the received power, $P_{0\_RACH,current}$, the detection threshold D and said estimation of received power, $CDF_{RFPA}$, of a transmission attempt of a mobile station (MS), and
- wherein the broadcasting circuitry is configured to broadcast said computed new value of the received power, $P_{0\_RACH,current}$, to mobile stations in an area covered by the base station.

21. The communication network node according to claim 20, wherein said RA optimizing processor is configured to:
- estimate a value, $E_f$, of the probability of a false detection, $P_f$,
- compute a detection threshold based on said estimation of the probability of a false detection, $P_f$, and a predetermined maximum false detection probability, $R_f$.

22. The communication network node according to claim 21, wherein said RA optimizing processor is configured to:
- send RA responses to mobile stations determined to have sent preambles to the base station,
- estimate a value $E_f$ based on Connection Request received signals from the mobile stations, compute a detection threshold based on said estimation of the probability of a false detection, $P_f$, and a predetermined maximum false detection probability, $R_f$.

23. The communication network node according to claim 15, wherein said RA optimizing processor is configured to:
- estimate a value, $E_m$, of the probability of a detection miss, $P_m$, and a cumulative distribution of estimated received power $CDF_{RFPA}$ of a first transmission attempt of a mobile station,
- tune RA parameters for forcing said estimated value, $E_m$, of a probability of a detection miss to converge to a predetermined value of a detection threshold ($R_m$), and
- cause said tuned RA parameters to be broadcast the mobile stations in an area covered by the base station,
- estimate a value, $E_f$, of the probability of a false detection, $P_f$, based on correlation peaks, compute a detection threshold D based on said estimation, $E_f$, of the probability of a false detection, Pf, and a predetermined maximum false detection probability, Rf.

24. The network node according to claim 15, wherein the predetermined random access attempt success requirements include an access probability or access delay requirement.

25. The network node according to claim 15, wherein the storage unit is configured to request a report from the mobile station including a number of preamble transmission attempts to the base station made by the mobile station in order to perform a successfully executed random access to the base station.

* * * * *

UNITED STATES PATENT AND TRADEMARK OFFICE
CERTIFICATE OF CORRECTION

PATENT NO. : 8,805,362 B2  
APPLICATION NO. : 13/061856  
DATED : August 12, 2014  
INVENTOR(S) : Amirijoo et al.

Page 1 of 1

It is certified that error appears in the above-identified patent and that said Letters Patent is hereby corrected as shown below:

In the Specification

In Column 13, Line 12, delete "$N_j$" and insert -- $N_i$ --, therefor.

In Column 13, Line 15, delete "$N_j$." and insert -- $N_i$. --, therefor.

In Column 16, Line 53, delete "esponse" and insert -- response --, therefor.

In the Claims

In Column 20, Line 32, in Claim 13, delete "ramdom" and insert -- random --, therefor.

In Column 20, Line 39, in Claim 13, delete "statisfy" and insert -- satisfy --, therefor.

In Column 21, Line 18, in Claim 15, delete "probabiiity" and insert -- probability --, therefor.

Signed and Sealed this  
Twenty-sixth Day of May, 2015

Michelle K. Lee  
*Director of the United States Patent and Trademark Office*